(12) United States Patent
Xu (10) Patent No.: US 11,937,588 B2
(45) Date of Patent: Mar. 26, 2024

(54) FOLDING DIP NET FIXED WITH TWO FULCRUMS

(71) Applicant: HANGZHOU FUFAN INDUSTRY CO., LTD., Hangzhou (CN)

(72) Inventor: Hongjian Xu, Hangzhou (CN)

(73) Assignee: HANGZHOU FUFAN INDUSTRY CO., LTD., Hangzhou (CN)

( * ) Notice: Subject to any disclaimer, the term of this patent is extended or adjusted under 35 U.S.C. 154(b) by 8 days.

(21) Appl. No.: 17/841,632

(22) Filed: Jun. 15, 2022

(65) Prior Publication Data
US 2023/0404048 A1 Dec. 21, 2023

(51) Int. Cl.
*A01K 77/00* (2006.01)

(52) U.S. Cl.
CPC .................. *A01K 77/005* (2022.02)

(58) Field of Classification Search
CPC .............................. A01K 77/005; A01K 77/00
USPC ......................................... 43/11, 12
See application file for complete search history.

(56) References Cited

U.S. PATENT DOCUMENTS

| | | | | |
|---|---|---|---|---|
| 2,354,942 A * | 8/1944 | Chapman | | A01K 77/00 43/12 |
| 2,683,321 A * | 7/1954 | Faber | | A01K 77/00 403/328 |
| 6,101,756 A * | 8/2000 | Baker | | A01K 77/00 43/12 |
| 8,356,443 B1 * | 1/2013 | Hume | | A01K 77/00 43/11 |
| 2019/0053475 A1 * | 2/2019 | Xu | | A01K 74/00 |
| 2020/0163314 A1 * | 5/2020 | Gabbai | | G06N 3/08 |
| 2020/0359611 A1 * | 11/2020 | Xu | | A01K 75/02 |
| 2020/0404893 A1 * | 12/2020 | Xu | | A01K 77/00 |
| 2021/0059231 A1 * | 3/2021 | Hogan | | A01K 77/00 |
| 2023/0085294 A1 * | 3/2023 | Makos | | A01K 77/005 |

* cited by examiner

*Primary Examiner* — Joshua J Michener
*Assistant Examiner* — Nicole Paige Maccrate
(74) *Attorney, Agent, or Firm* — Jiwen Chen; Joywin IP Law PLLC (57) ABSTRACT

A folding dip net fixed with two fulcrums comprises a net rod and a net rack. A connecting part and a lock catch are disposed at a front end of the net rod. A tail end of the net rack is mounted on two sides of the connecting part through rotating shafts. The lock catch is slidably connected to the net rod and locks the tail end of the net rack when the net rack is unfolded. Clamping grooves are formed in the two sides of the connecting part and are communicated with a bottom surface of the connecting part. The clamping grooves are of an arc structure and become narrower gradually from bottom to top. Support parts are disposed on the two sides of the connecting part and are located above the clamping grooves. Protrusions are disposed on the net rack and are located on the two sides of the connecting part. When the net rack is unfolded, the protrusions are located in the clamping grooves in the corresponding sides, and tops of the protrusions contact bottoms of the support parts on the corresponding sides, so that two fulcrums are formed at the tail end of the net rack. This structure can prevent the net rack from inclining, so the net rack is more stable in the fish scooping process, and the tail end of the net rack will not get rid of the restriction of the lock catch, which may otherwise lead to an escape of fishes in a string bag.

10 Claims, 6 Drawing Sheets

FOLDING DIP NET FIXED WITH TWO FULCRUMS

BACKGROUND OF THE INVENTION

1. Technical Field

The present invention relates to the field of fishing gears, in particular to a folding dip net fixed or mounted with two fulcrums.

2. Description of Related Art

In the fishing process, it is an indispensable link to scoop fishes with dip nets. Particularly when big fish are caught, it will be very difficult to get the big fish onto the bank without dip nets, and even the fish may escape, which makes all previous labor in vain. So, the structure and quality of the dip nets, as indispensable fishing gears, are particularly important for fishing.

The applicant has applied for a Utility Model Patent (No. CN209677148U) entitled "Folding Triangular Dip Net", which comprises a dip net rod and a net rack, wherein the net rack comprises rigid rod members and a flexible rod member; the dip net rod is of a telescopic structure, a connecting base, an annular fastener and a limit ring are disposed at a front end of the dip net rod, the connecting base and the limit ring are fixed around the dip net rod in a spaced manner, the connecting seat becomes narrower gradually from front to back, the annular fastener is disposed between the connecting base and the limit ring, buckles are disposed on left and right sides of the annular fastener, and a return spring is disposed in the annular fastener; and rear ends of the two rigid rod members are connected to left and right sides of the connecting base through rotary pins respectively and are matched with the annular fastener, and two ends of the flexible rod member are fixed or mounted to front ends of the rigid rod members on two sides respectively.

However, the folding triangular dip net has the following problems in use: the tail end of the net rack is locked merely with the annular fastener, which is locked only by means of the elastic force of the return spring, so the net ring may swing in the fish scooping process, which makes fish scooping instable; and particularly, when the fish is heavy, a large downward force will be applied to the string bag, the front end of the net rack inclines downwards, even the tail end of the net rack may get rid of the annular fastener, and at this moment, a scooped fish may escape, which lowers the user experience. So, the folding triangular dip net needs to be further improved.

BRIEF SUMMARY OF THE INVENTION

The object of the present invention is to provide a folding dip net fixed or mounted with two fulcrums to solve the problem that the net rack of the existing folding triangular dip net is instable during fish scooping and even the tail end of the net rack may get rid of the annular fastener, resulting in an escape of a scooped fish.

For the sake of a brief description of this application, the applicant omits 'string bag' in the following text description, and the string bag is not shown in the figures either. But those skilled in the art would appreciate that the string bag should be attached to or mounted on the net rack when the folding dip net in this patent is used.

The technical solution provided by the present invention to fulfill the above object is as follows:

The present invention relates to a folding dip net fixed with two fulcrums, comprising a net rod and a net rack, wherein a connecting part and a lock catch are disposed at a front end of the net rod, a tail end of the net rack is mounted on two sides of the connecting part through rotating shafts, the lock catch is slidably connected to the net rod and locks the tail end of the net rack when the net rack is unfolded, clamping grooves are formed in the two sides of the connecting part and are communicated with a bottom surface of the connecting part, the clamping grooves are of an arc structure and become narrower gradually from bottom to top, and support parts are disposed on the two sides of the connecting part and are located above the clamping grooves; protrusions are disposed on the net rack and are located on the two sides of the connecting part; and when the net rack is unfolded, the protrusions are located in the clamping grooves in the corresponding sides, and tops of the protrusions contact bottoms of the support parts on the corresponding sides, so that two fulcrums are formed at the tail end of the net rack.

Preferably, a return reed is disposed on the connecting part, a front end of the return reed is connected to the connecting part, a slope becoming higher gradually from front to back is disposed on an upper surface of the return reed, and the upper surface of the return reed is matched with an inner ring of the lock catch to return the lock catch and lock the net rack.

Preferably, the net rack comprises two rigid rod members and a flexible rod member, tail ends of the two rigid rod members are mounted on the two sides of the connecting part through the rotating shafts respectively, and two ends of the flexible rod member are fixed or mounted to front ends of the two rigid rod members, respectively.

Preferably, the connecting part becomes narrower gradually from front to back, so that the width of the net rack can be decreased after the net rack is folded.

Preferably, tail ends of the rigid rod members are sleeved with rotating members, the protrusions and the rotating shafts are disposed on the rotating members, and a corner between a top surface and a rear surface of each said rotating member is an arc corner. When the net rack is unfolded, the arc corners between the top surfaces and the rear surfaces of the rotating members contact the front end of the lock catch to apply a backward force to the lock catch to compress the return reed; and when the tail ends of the rotating members completely enter the inner ring of the lock catch, the return reed enables the lock catch to return to lock the rotating members.

Preferably, buckles are disposed on two sides of the lock catch. When the net rack is folded, users pull the lock catch backwards by holding the buckles on the two sides of the lock catch with the index finger and the middle finger, so as to unlock the tail end of the net rack.

Preferably, a handheld part is disposed in a middle of a front end of the connecting part. When a heavy fish is scooped, users can lift up the dip net by holding the net rod with one hand and holding the handheld part at the front end of the connecting part with the other hand.

Preferably, the net rod is of a telescopic structure and comprises an internal rod member and an external rod member, the internal rod member is inserted into the external rod member from a front end of the external rod member, and a locking part for locking the internal rod member is disposed on the external rod member. The net rod of the telescopic structure is suitable for scooping fishes at different distances.

Preferably, the locking part comprises a sheath and a button, the sheath is disposed around the external rod member, the button is hinged to the sheath, a return spring is disposed at a hinge point of the button and the sheath, and a bolt penetrating through the external rod member is disposed on a lower surface of the button; and bolt holes fitting the bolt are formed in a front end and a rear end of an upper surface of the internal rod member.

Preferably, a tail end of the external rod member is sleeved with a rubber handle, so that the friction between hands of users and the net rod is increased.

By adoption of the above technical solution, the present invention has the following beneficial effects over the prior art:

1. According to the folding dip net fixed or mounted with two fulcrums, the clamping grooves are formed in the two sides of the connecting part at the front end of the net rod and are communicated with the bottom surface of the connecting part, the support parts are disposed on the two sides of the connecting part and are located above the clamping grooves, and the protrusions are disposed on the net rack and are located on the two sides of the connecting part; when the net rack is unfolded, the protrusions are located in the clamping grooves in the corresponding sides, and the tops of the protrusions contact the bottoms of the support parts on the corresponding sides, so that two fulcrums are formed at the tail end of the net rack; the tail end of the net rack is locked with the lock catch; in the fish scooping process, a downward force is applied to the net rack, the front end of the net rack has a trend to incline downwards, that is, the tail end of the net rack has a trend to move upwards, and at this moment, the two fulcrums formed by the support parts can press against the tail end of the net rack to prevent the net rack from inclining, so that the net rack is more stable in the fish scooping process, and the tail end of the net rack will not get rid of the restriction of the lock catch, which may otherwise lead to an escape of fishes in a string bag.

2. The net rack of the folding dip net fixed or mounted with two fulcrums comprises two rigid rod members and a flexible rod member, the tail ends of the two rigid rod members are disposed on two sides of the connecting part through rotating shafts respectively, two ends of the flexible rod member are fixed to the front ends of the two rigid rod members respectively, and the connecting part becomes narrower gradually from front to back, so that the dip net is narrower in the folded state, thus being easier to transport and store.

BRIEF DESCRIPTION OF THE SEVERAL VIEWS OF THE DRAWINGS

FIG. 6 is a detailed structural view of a rotating member.
Reference signs: 1, net rod; 11, connecting part; 111, clamping groove; 112, support part; 113, return reed; 114, handheld part; 12, lock catch; 13, internal rod member; 14, external rod member; 141, rubber handle; 15, locking part; 151 sheath; 152, button; 153, bolt; 121, buckle; 2, net rack; 21, rigid rod member; 211, rotating member; 212, rotating shaft; 213 (213*a*, 213*b*) protrusion(s); 214, arc corner; 22, flexible rod member.

DETAILED DESCRIPTION OF THE INVENTION

For a better understanding of the present invention, the present invention will be expounded below with reference to embodiments. The following embodiments are used to explain the present invention, but are not intended to limit the scope of the present invention.

For the sake of a brief description of this application, the applicant omits 'string bag' in the following text description, and the string bag is not shown in the figures either. But those skilled in the art would appreciate that the string bag should be attached to or mounted on the net rack when the folding dip net in this patent is used. In addition, to facilitate the description of the content of the present invention, the direction of the net rack with respect to the net rod is defined as a front end in this embodiment.

Figure 1:
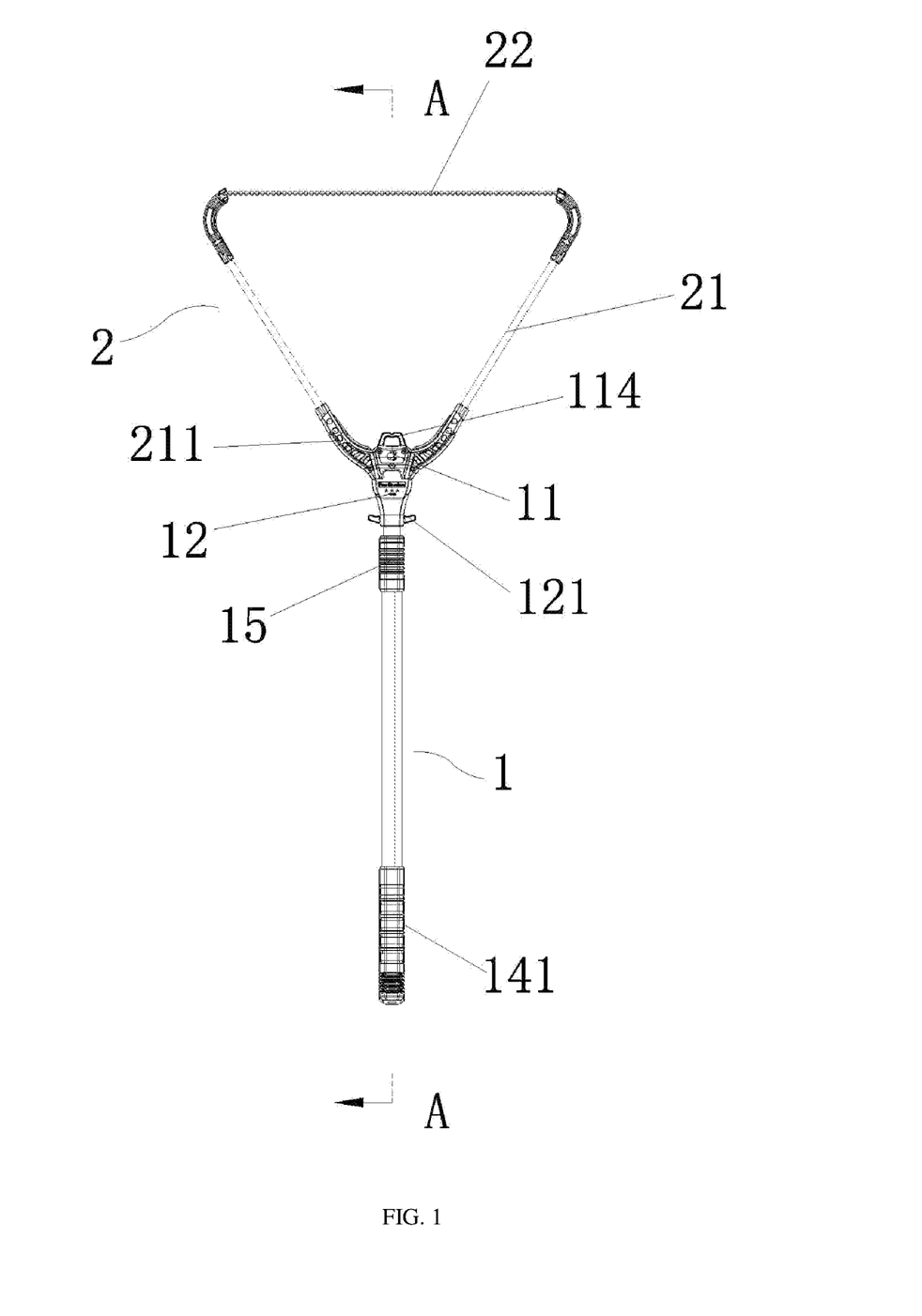
FIG. 1 is a front view of a folding dip net fixed or mounted with two fulcrums.
Figure 2:
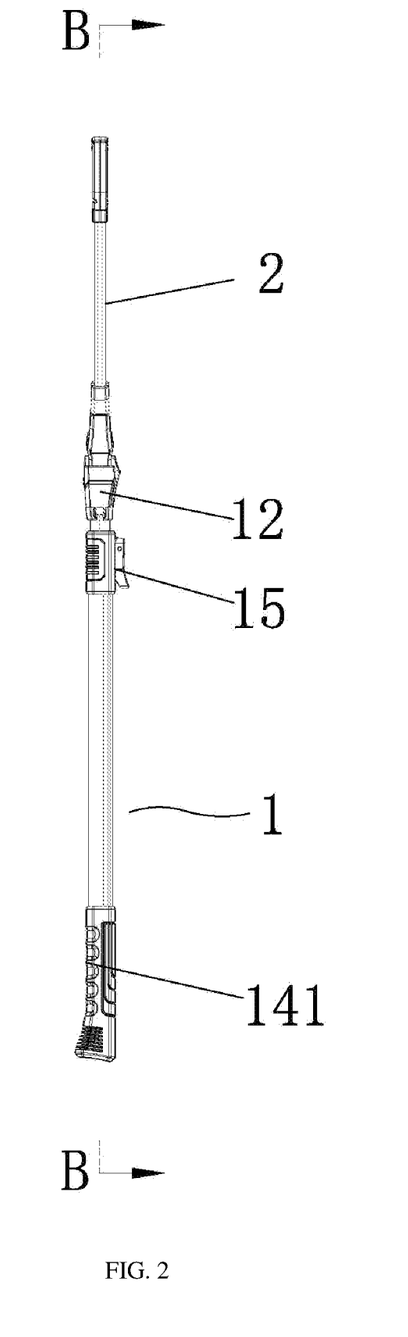
FIG. 2 is a side view of the folding dip net fixed or mounted with two fulcrums.

As shown in FIG. 1 and FIG. 2, the present invention relates to a folding dip net fixed with two fulcrums, comprising a net rod 1 and a net rack 2. A connecting part 11 and a lock catch 12 are disposed at a front end of the net rod 1, a tail end of the net rack 2 is mounted on two sides of the connecting part 11 through rotating shafts, and the lock catch 12 is slidably connected to the net rod 1 and locks the tail end of the net rack 2 when the net rack 2 is unfolded.

As show in FIG. 3-FIG. 6, the connecting part 11 becomes narrower gradually from front to back, clamping grooves 111 are formed in two sides of the connecting part 11 respectively and are communicated with a bottom surface of the connecting part 11, the clamping grooves 111 are of an arc structure and become narrower gradually from bottom to top, and support parts 112 are disposed on the two sides of the connecting part 11 and are located above the clamping grooves 111. The net rack 2 comprises two rigid rod members 21 and a flexible rod member 22, tail ends of the two rigid rod members 21 are sleeved with rotating members 211, rotating shafts 212 and protrusions 213 are disposed on inner sides of the rotating members 211, the rotating members 211 of the two rigid rod members 21 are mounted on the two sides of the connecting part 22 through the rotating shaft 212 respectively, and two ends of the flexible rod member 22 are fixed to front ends of the two rigid rod members 21 respectively. When the net rack 2 is unfolded, each protrusion 213 is located in the clamping groove 111 in the corresponding side, and the top of each protrusion 213 contacts the bottom of the support part 112 on the corresponding side, so that two fulcrums are formed at the tail end of the net rack 2.

Figure 3:
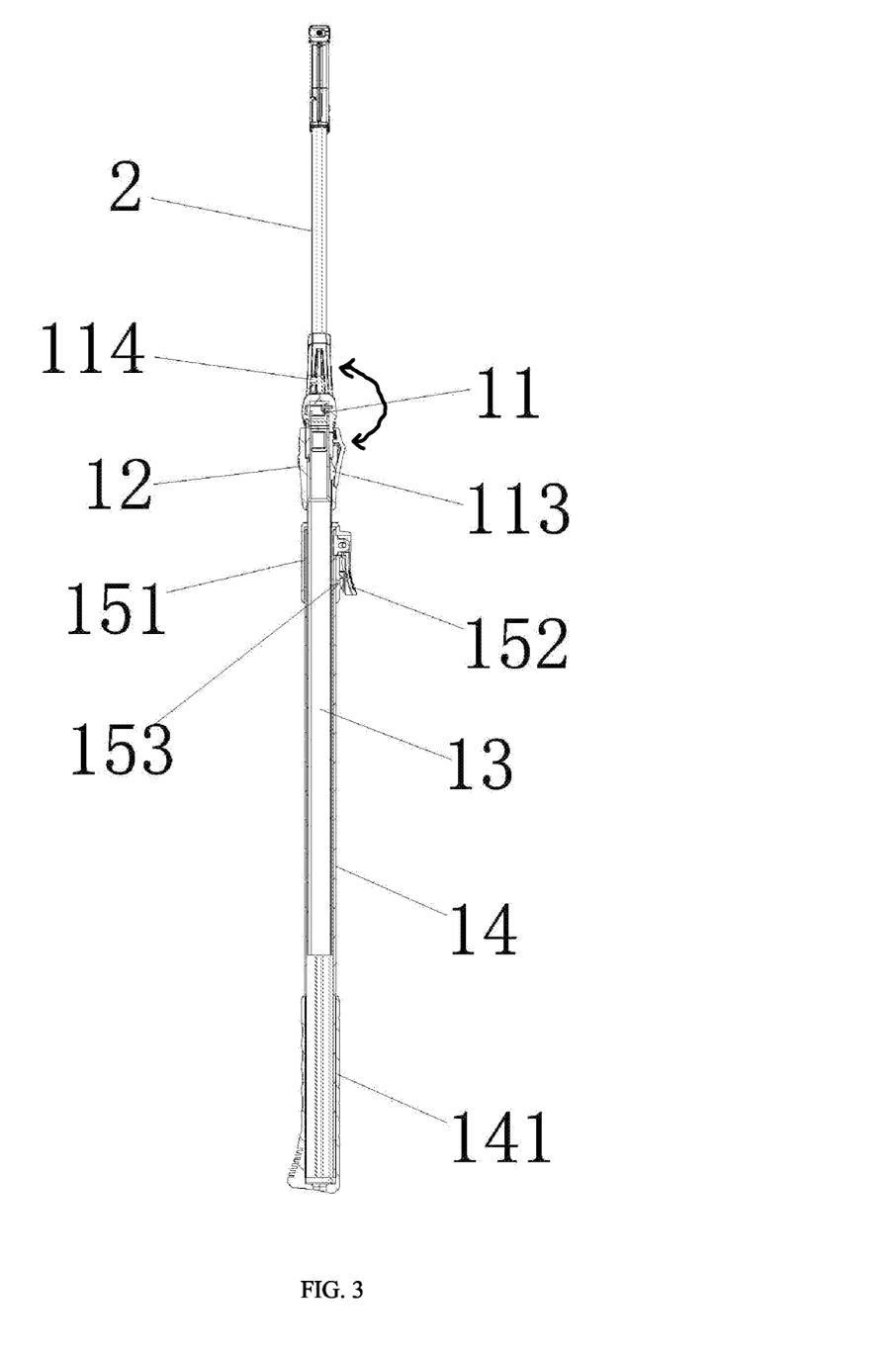
FIG. 3 is a sectional view of the folding dip net fixed or mounted with two fulcrums along A-A in FIG. 1.
Figure 5:
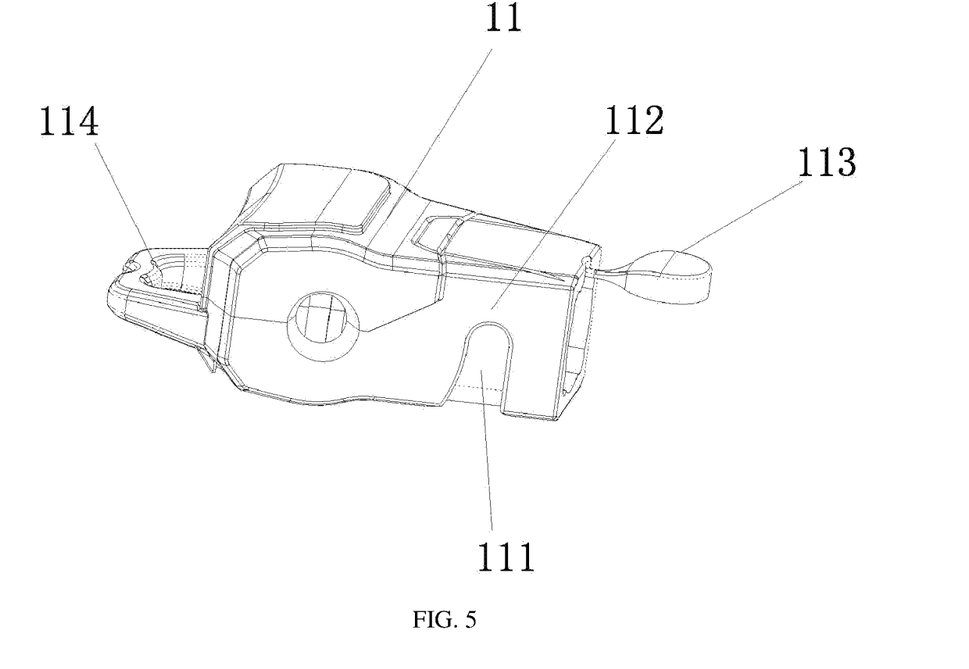
FIG. 5 is a detailed structural view of a connecting part.

As shown in FIG. 3 and FIG. 5, a return reed 113 for returning the lock catch 12 is disposed on the connecting part 11, a front end of the return reed 113 is connected to the connecting part 11, a slope which becomes higher gradually from front to back is disposed on an upper surface of the return reed 113, and the upper surface of the return reed 113 is matched with an inner ring of the lock catch.

Figure 6:
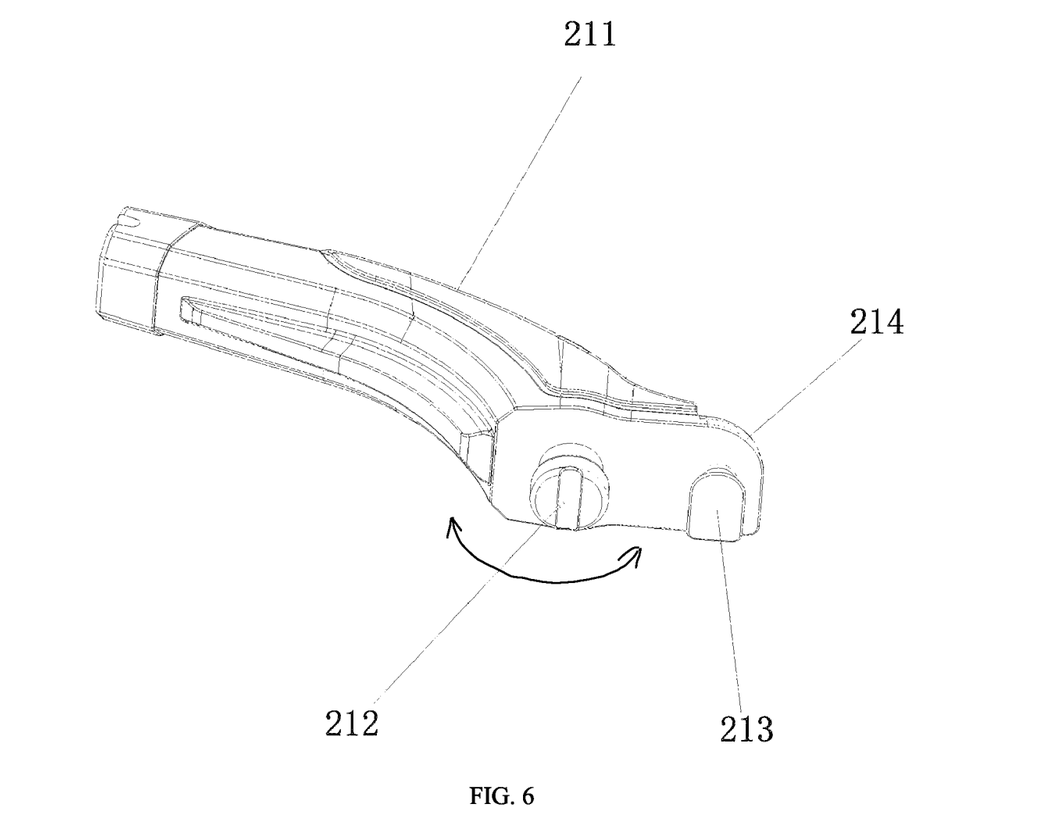

As shown in FIG. 6, a corner 214 between a top surface and a rear surface of each rotating member 211 is an arc corner. When the net rack 2 is unfolded, the arc corners 214 of the rotating members 211 contact the front end of the lock catch 12 to apply a backward force to the lock catch 12 to compress the return reed 113; and when the tail ends of the rotating members 211 completely enter the inner ring of the lock catch 12, the return reed 113 rebounds upwards to return the lock catch 12 by means of the slope on the upper surface of the return reed 113, and then, the rotating members 211 are locked.

Figure 4:
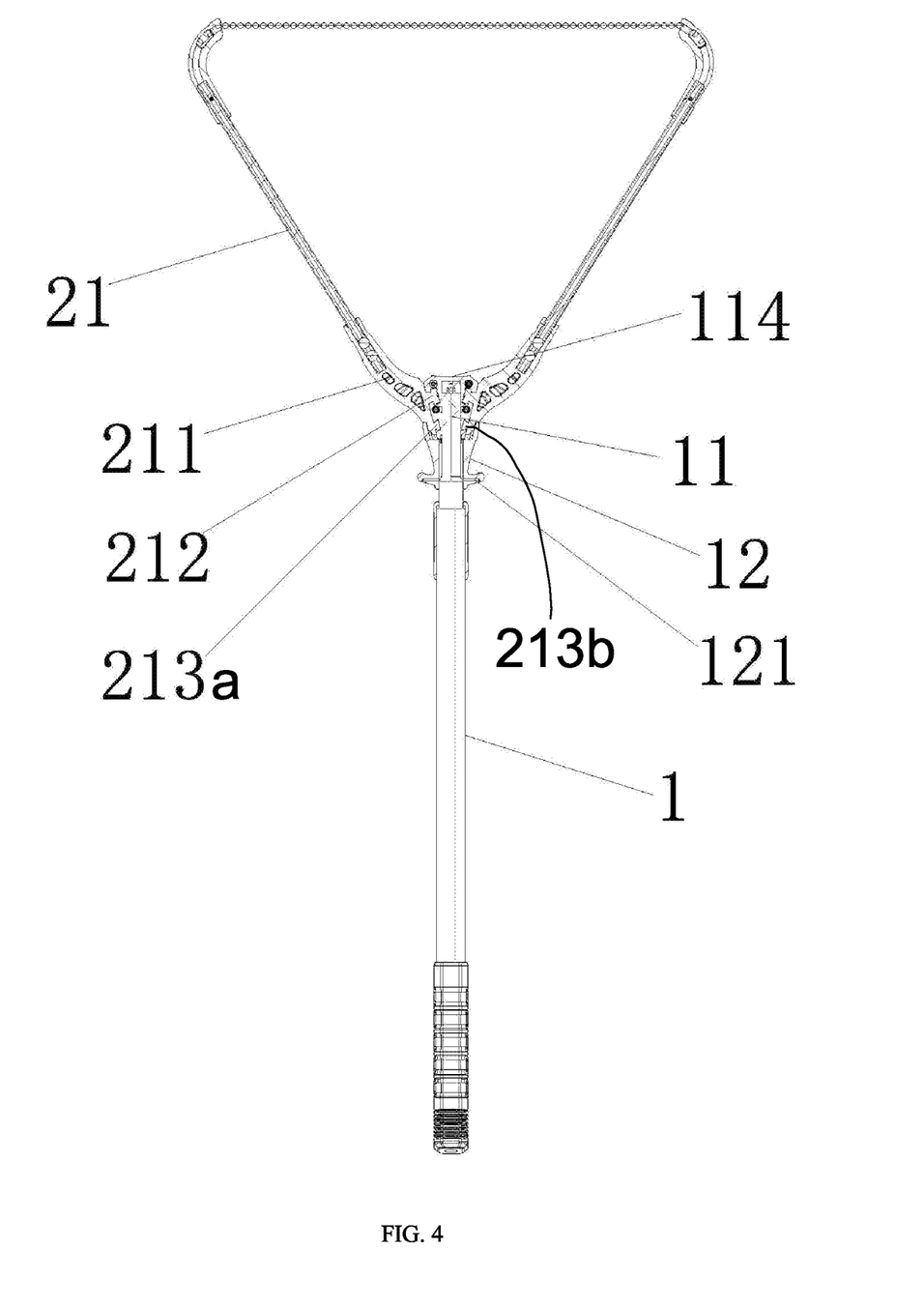
FIG. 4 is a sectional view of the folding dip net fixed or mounted with two fulcrums along B-B in FIG. 2.

As shown in FIG. 4 and FIG. 5, in this embodiment, the connecting part 11 becomes narrower gradually from the front end to the rear end, so the width of the net rack 2 in the folded state is decreased. Referring to FIG. 1 and FIG. 4, the buckles 121 are disposed on two sides of the lock catch 12, and when the net rack 2 is folded, users pull the lock catch 12 backwards by holding the buckles 121 on the two sides of the lock catch with the index finger and the middle finger, so as to unlock the tail end of the net rack 2. As shown in FIG. 1, FIG. 4 and FIG. 5, a handheld part 114 is disposed in the middle of the front end of the connecting part 11, and when a heavy fish is scooped, users can lift up the dip net by holding the net rod 1 with one hand and holding the handheld part 114 at the front end of the connecting part with the other hand.

As shown in FIG. 3, in this embodiment, the net rod 1 is of a telescopic structure, and comprises an internal rod member 13 and an external rod member 14, wherein the internal rod member 13 is inserted into the external rod member 14 from a front end of the external rod member 14, and a locking part 15 for locking the internal rod member 13 is disposed on the external rod member 14. The locking part 15 comprises a sheath 151 and a button 152, wherein the sheath 151 is disposed around the external rod member 14, the button 152 is hinged to the sheath 151, a return spring is disposed at a hinge point of the button 152 and the sheath 151 and is a torsion spring, and a bolt 153 penetrating through the external rod member 14 is disposed on a lower surface of the button 152; and bolt holes fitting the bolt 153 are formed in a front end and a rear end of an upper surface of the internal rod member 13. The net rod of the telescopic structure is suitable for scooping fishes at different distances. A tail end of the external rod member 14 is sleeved with a rubber handle 141, so that the friction between the hand of users and the net rod is increased.

The folding dip net fixed or mounted with two fulcrums is used as follows:

When used, the folding dip net fixed with two fulcrums is unfolded first, that is, the rigid rod members 21 on two sides are pulled to rotate with the rotating shafts 212 as the axis; when the arc corners 214 of the rotating members 211 at the tail ends of the rigid rod members 21 contact the front end of the lock catch 12, the rotating members 211 apply a backward force to the lock catch 12, so the lock catch 12 moves backwards and presses the return reed 113 downwards; at this moment, the protrusions 213 on the rotating members 211 are exactly clamped in the clamping grooves 111 in the connecting part 11; when the tail ends of the rotating members 211 completely enter the lock catch 12, the front end of the lock catch 12 will be released, the return reed 113 returns upwards and pushes the lock catch 12 to move forwards to lock the rotating members 211, and at this moment, the top surfaces of the protrusions 213 exactly contact the bottom surfaces of the support parts 112. When the folding dip net fixed with two fulcrums is used to scoop fishes, a downward force will be applied to the front ends of the rigid rod members 21 under the gravity of a scooped fish, so the tail ends of the rigid rod members 21 have a trend to move upwards; at this moment, the support parts 112 abut against the rotating members 211 to prevent the front ends of the rigid rod members 21 from inclining downwards, so that the stability of fish scooping is guaranteed, and the rigid rod members 21 will not get rid of the lock catch, which may otherwise lead to an escape of the fish.

When the folding dip net fixed with two fulcrums is to be folded after use, users pull the lock catch 12 backwards by hand to enable the rotating members 211 to get rid of the restriction of the lock catch 12, and then pull the rigid rod members 21 upwards by holding the front ends of the rigid rod members 21, so the tail ends of the rigid rod members 21 move downwards, the protrusions 213 are disengaged from the clamping grooves 111, and the net rack is folded. Because the connecting part becomes narrower gradually from front to back, the overall width of the net rack is decreased after the net rack is folded.

The present invention is expounded above with reference to embodiments, but the above embodiments are only preferred ones of the present invention and are not intended to limit the implementation scope of the present invention. All equivalent transformations and improvements achieved without deviating from the application scope of the present invention should also fall within the scope of the present invention.

What is claimed is:

1. A folding dip net fixed or mounted with two fulcrums, comprising a net rod and a net rack, a connecting part and a lock catch being disposed at a front end of the net rod, a tail end of the net rack being mounted on two sides of the connecting part through rotating shafts, the lock catch being slidably connected to the net rod and locking the tail end of the net rack when the net rack is unfolded, wherein clamping grooves are formed in the two sides of the connecting part and are communicated with a bottom surface of the connecting part, the clamping grooves are of an arc structure and become narrower gradually from bottom to top, and support parts are disposed on the two sides of the connecting part and are located above the clamping grooves; protrusions are disposed on the net rack and are located on the two sides of the connecting part; and when the net rack is unfolded, the protrusions are located in the clamping grooves in the corresponding sides, and tops of the protrusions contact bottoms of the support parts on the corresponding sides, so that two fulcrums are formed at the tail end of the net rack.

2. The folding dip net fixed or mounted with two fulcrums according to claim 1, wherein a return reed is disposed on the connecting part, a front end of the return reed is connected to the connecting part, a slope becoming higher gradually from front to back is disposed on an upper surface of the return reed, and the upper surface of the return reed is matched with an inner ring of the lock catch to return the lock catch and lock the net rack.

3. The folding dip net fixed or mounted with two fulcrums according to claim 1, wherein the net rack comprises two rigid rod members and a flexible rod member, tail ends of the two rigid rod members are mounted on the two sides of the connecting part through the rotating shafts respectively, and two ends of the flexible rod member are fixed to front ends of the two rigid rod members respectively.

4. The folding dip net fixed or mounted with two fulcrums according to claim 3, wherein the connecting part becomes narrower gradually from front to back.

5. The folding dip net fixed or mounted with two fulcrums according to claim 3, wherein tail ends of the rigid rod members are sleeved with rotating members, the protrusions and the rotating shafts are disposed on the rotating members, and a corner between a top surface and a rear surface of each said rotating member is an arc corner.

6. The folding dip net fixed or mounted with two fulcrums according to claim 1, wherein buckles are disposed on two sides of the lock catch.

7. The folding dip net fixed or mounted with two fulcrums according to claim 1, wherein a handheld part is disposed in a middle of a front end of the connecting part.

8. The folding dip net fixed or mounted with two fulcrums according to claim 1, wherein the net rod is of a telescopic structure and comprises an internal rod member and an external rod member, the internal rod member is inserted into the external rod member from a front end of the external rod member, and a locking part for locking the internal rod member is disposed on the external rod member.

9. The folding dip net fixed or mounted with two fulcrums according to claim 8, wherein the locking part comprises a sheath and a button, the sheath is disposed around the external rod member, the button is hinged to the sheath, a return spring is disposed at a hinge point of the button and the sheath, and a bolt penetrating through the external rod member is disposed on a lower surface of the button; and bolt holes fitting the bolt are formed in a front end and a rear end of an upper surface of the internal rod member.

10. The folding dip net fixed or mounted with two fulcrums according to claim 8, wherein a tail end of the external rod member is sleeved with a rubber handle.

* * * * *